Aug. 24, 1954   G. T. WEST ET AL   2,687,110
EMULSION ADHESIVE APPLICATOR
Filed Aug. 18, 1950   2 Sheets-Sheet 1

George T. West
Walter H. Winters
Malcolm J. Odell
Richard P. Stokes
Inventors

By Theodore C. Browne
Attorney

Aug. 24, 1954   G. T. WEST ET AL   2,687,110
EMULSION ADHESIVE APPLICATOR

Filed Aug. 18, 1950   2 Sheets-Sheet 2

George T. West
Walter H. Winters
Malcolm J. Odell
Richard P. Stokes
Inventors

By Theodore C. Browne
Attorney

Patented Aug. 24, 1954

2,687,110

UNITED STATES PATENT OFFICE 2,687,110

EMULSION ADHESIVE APPLICATOR

George T. West and Walter H. Winters, Minneapolis, Minn., and Malcolm J. Odell, Manchester, and Richard P. Stokes, Malden, Mass., assignors to Dewey and Almy Chemical Company, Cambridge, Mass., a corporation of Massachusetts Application August 18, 1950, Serial No. 180,252

3 Claims. (Cl. 118—246)

This invention relates generally to adhesive applicators and in particular to an adhesive applicator used in combination with box taping machinery which will apply adhesive to the sealing tapes used for sealing the joints in corrugated boxes at the moment that the tape is used.

A new class of resin emulsion adhesives has recently appeared. These adhesives spread so evenly and "grab" so quickly that it no longer is necessary to precoat box tapes with glue and dampen the glue at the instant of application. Instead, a plain corner tape may be "gummed" with the new adhesives in a conventional box taping machine and stuck across the box joint practically simultaneously.

There are various designs of box taping machines, but essentially they consist of a transport device for feeding flat folded boxes one by one under a joint taping head, a water applicator roll which wets the gummed side of the tape, and an adjustable tape-measuring and cutoff device which cuts off from a continuous web the length of tape required to close the box joint. The measuring-cutoff device is tripped by the leading edge of the box as it passes through the taping head. Simultaneously, the free end of the tape is stuck down on the box across its joint adjacent the leading edge while remaining length of tape is pulled into joint-taping position by the forward motion of the box.

From the foregoing description, it is apparent that the tape passes through the taping head in a discontinuous manner, moving very rapidly as a box is being taped and stopping until the next box is fed. Since the applicator roll turns only because of the pull of the moving tape on its periphery, the roll stops when the tape stops moving.

The new so-called "emulsion" adhesives are aqueous dispersions of an adhesive resin, but additionally an organic solution of another sticky quick-grabbing resin is emulsified in the continuous aqueous phase of the dispersion so that two discontinuous phases coexist: one, the adhesive resin as the suspended, solid dispersoid, and, two, droplets of the dissolved resin, both being separate and surrounded by the aqueous continuous phase.

The dispersion is not adhesive in itself, but as soon as it is spread on paper, wood, or for that matter any water absorptive surface, the emulsion breaks and a very considerable proportion of the full adhesive strength of the compound develops almost instantly, although the water which has separated from the emulsion is still present in the paper and in the adhesive film. Unlike animal glues, which previously have been used, these adhesives are much more water resistant than is the paper or box board. Since a dependable "quick grab" occurs instantly, an uncoated kraft or the various thread reinforced tapes may be coated with the adhesive at the normal tape dampening or wetting station of a box taping machine and instantly thereafter may be laid down across the box joint where it will form a permanent, strong, flexible, waterproof bond. These advantages have given the new "emulsion adhesives" wide acceptance.

Unfortunately, the very property which makes the adhesive valuable as a box taping adhesive causes trouble whenever the adhesives are run on box taping machines, because such machines are not run continuously. They jamb occasionally if boxes are misfed or the board is too springy, and often are stopped while the machine is being adjusted to another size of box. During the shutdown, sufficient water evaporates from the film of adhesive on the stationary applicator roll to break the emulsion and, once the emulsion has broken, the resins will not redisperse or emulsify. Consequently, a sticky mass builds up on the applicator roll which brings the operation to a standstill until the roll is thoroughly cleaned. This is a costly nuisance in a box factory and, until now, has limited the use of "emulsion adhesives."

The broad object of this invention is to produce an emulsion adhesive applicator which will not suffer from the gumming up of the rolls.

The particular object is to produce an adhesive applicator for box taping machines which may be quickly substituted for the damping or water applicator element of a conventional box taping machine.

We have discovered that these adhesives will not break if their surface is continuously renewed with a supply of fresh adhesive and, consequently, if the applicator roll is continuously rotated through the supply of adhesive at a low speed, deposits of resin will not build up on its surface.

The discontinuous manner in which the tape moves through the machine, however, makes it impossible to use a simple driven roll.

In the usual box taping machine, as the flat folded box approaches the taping station, it trips a tape feed mechanism which lays the forward edge of a long length of tape across the joint. A pressure roll irons the tape into contact with the box, and then the forward motion of the box pulls the tape from the supply roll and through the tape feed mechanism. A timed knife severs the tape at the desired length, which is usually the height of the box, and then the box is taken down a long take-off track where, usually, a pressure belt running just above the track maintains pressure on the newly taped joint for a second or two as the flat folded box travels to the bundling table. The tape is normally fed from a large supply roll over several feed rolls, through a tensioning device, and into the tape feed mechanism.

In adapting such a box taping machine for use with a resin emulsion adhesive, we replace the ordinary moistening roll and water applicator with the mechanism illustrated in the drawings of which:

Figure 1:
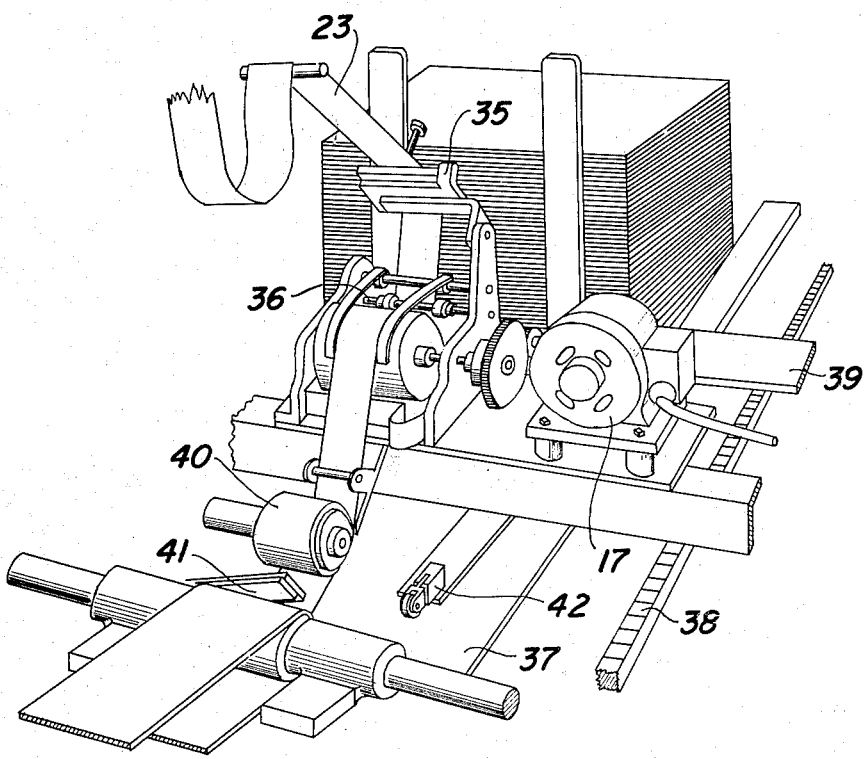
Figure 1 is a perspective view of one form of our adhesive applicator applied to a well known box taping machine (only those parts of the box machine essential for an understanding of this invention are shown)

A free-running applicator roll 10 is mounted on shaft 11 which is journaled in suitable bearings 12 and 13 mounted in frame 14. The design and weight of the applicator roll and the bearings are chosen to permit the freest rotation of the roll which is possible in order to minimize the effect of inertia, which is very great because of the inherent intermittent nature of the normal box taping operation.

The applicator roll dips into a supply 15 of resin emulsion adhesive maintained in feed pan 16. The adhesive is supplied to pan 16 from any suitable constant level device to maintain the level of the adhesive nearly uniform at all times.

Applicator roll 10 is driven by low speed motor 17 by means of a drive train consisting of motor shaft 18, motor gear 19, drive gear 21, overriding clutch 22, and applicator roll shaft 11, with the applicator roll 10 rotating in the direction of travel of tape 23. The speed of rotation may vary, but speeds between two and fifteen R. P. M. are recommended.

The limits of rotational velocity are determined by the fact that on the one hand the roll must be maintained moist at all times, and on the other hand the roll should not move at a velocity in excess of the slowest speed at which the tape passes over it.

Shaft 11 is attached to one face of overriding clutch 22 and drive gear 21 to the other face. The clutch is made in a conventional manner and is engaged only when the velocity of the driven element is equal to or less than that of the driving element. It is disengaged when the velocity of the driven element exceeds that of the driving element. Thus when the tape 23 is pulled across the face of adhesive applicator roll 10, the roll is free to move with the tape. The slow speed drive is effective to rotate applicator roll 10 only when the tape is not moving.

The film of adhesive on the surface of applicator roll 10 should be uniform. It is advisable, and necessary if adhesive "milage" is to be controlled, to provide a doctoring device located between the adhesive supply and the adhesive take-off positions on the applicator roll. A bar or knife may be used, but because the adhesive may dry on any stationary surface, we prefer a roll 24 for this purpose. It is mounted on doctor roll shaft 25 which is suitably journaled in bearing blocks 26, 26, which are mounted in sliding relation to frame 14. The gap between the doctor roll 24 and applicator roll 10 may be adjusted precisely by means of micrometer screws 27 and 28 mounted in frame 14 and working against the bearing blocks 26, 26. This permits the thickness of the film of adhesive applied to the tape to be adjusted accurately. To permit roll adjustment, doctor roll shaft 25 is connected to motor shaft 18 through a universal joint connection, which may be a coil spring 29, as shown. If a coil spring is used, each end of the coil is formed into a loop as shown at 31 and 32. These loops interact with pins 33 and 34 mounted in motor shaft 18 and doctor roll shaft 25. By driving the doctor roll in this manner the possibility of any of the adhesive drying out on the doctoring device and falling into adhesive pan 16 is eliminated. Tape hold down fingers 43 and 44 mounted on rod 45 are used to keep tape 23 in contact with applicator roll 10.

In the operation of the box taping machine, the tape 23 is led from a supply roll over appropriate guide rolls and then to a tensioning device 35. From the tensioning device, the tape passes under tape guide 36 mounted on frame 14 and then over the upper quadrant of applicator roll 10. From here, the tape passes into the regular tape feed mechanism, indicated only by the roll 40, at which point it is applied across the joint of box 37. After the end of the tape has been stuck to the box, the tape is pulled through this entire train by the forward motion of the box imparted through drive chain 38 and the push slat 39. The tape is severed by knife 41 which, in the various machines, is timed by cams, or by racks and pinions. In some instances, the timing is initiated by a sensing finger 42 which lifts as the box 37 passes beneath it.

Figure 3:
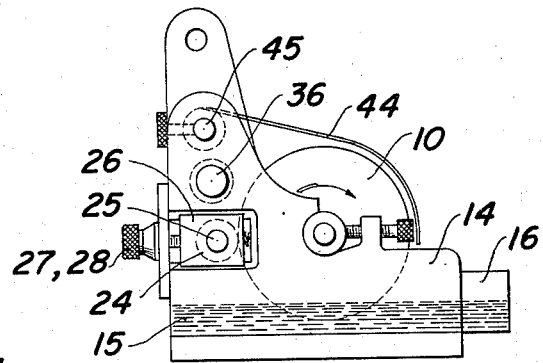
Figure 3 is a side elevation.
Figure 4:
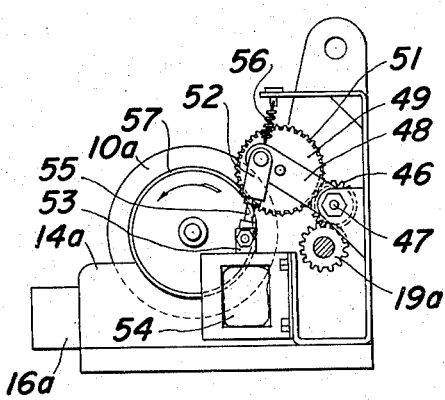
Figure 4 is a side elevation of an alternative design of our device.

An alternative arrangement which has a distinct advantage on certain makes of taping machines is shown in Figure 4. For clarity and illustration the doctor roll assembly which is identical to that illustrated in Figure 2 and Figure 3 is not shown in Figure 4.

Figure 2:
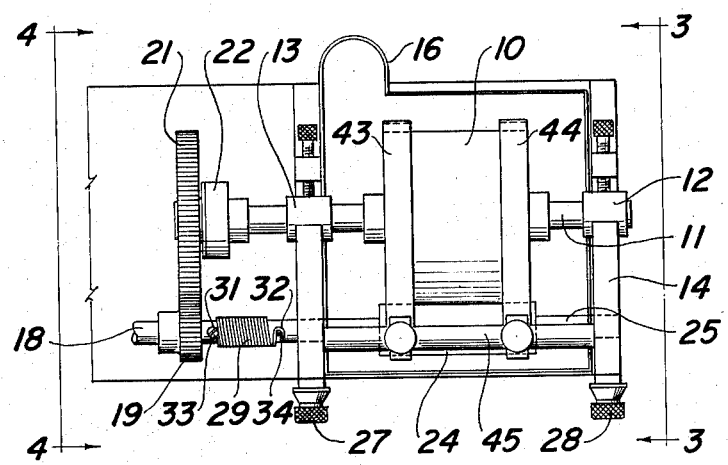
Figure 2 is a top plan view of the tape applicator.

In this alternative arrangement, the mechanical parts are identical with those shown in Figures 2 and 3 with the exception of gear 21 and clutch 22 which are replaced by a friction drive mechanism operated by a solenoid. Motor pinion 19a (Figure 4) engages an intermediate gear 46 journaled on stud 47 which also acts as a fulcrum point for arm 48. Arm 48 carries a drive gear 49 pinned to the arm in such a way that the gear 49 is constantly engaged with intermediate gear 46. Friction drive wheel 51 is mounted directly behind the gear 49, and operates about the same center. Clevis 52 is rotatably pinned to the outer end of arm 48 and connects with the armature 53 of the solenoid 54 through the swing connecting rod 55. The weight of the armature and the arm assembly is overbalanced by spring 56 so that when solenoid 54 is de-energized, the arm is lifted and friction drive wheel 51 is disengaged from friction rim 57 which is formed as a reduced diameter extension of applicator roll 10a. The solenoid is controlled through a sensing switch which is not shown since its location is necessarily variable because of the construction of the various taping machines, but as an example, the switch, a normally closed commercial microswitch, may be mounted to respond to the lifting motion of the wheel sensing finger 42 shown in Figure 1. Consequently, when a box 37 passes under the sensing finger 42, the microswitch will open and the solenoid being de-energized will permit the spring to lift the friction wheels out of engagement, thus freeing the applicator roll for free rotation by the box tape.

When quite small boxes are to be taped at high speed, it sometimes is desirable to energize the solenoid through a relay connected across the main drive control circuit, and not cause the solenoid to respond to the presence of each individual box. When this arrangement is adopted, the applicator roll turns freely as long as the main machine operates, but as soon as the main machine stops, the solenoid is energized, thus pulling the friction drive roll into engagement. Consequently, whenever the machine is idle, the applicator roll turns slowly and maintains a wet film or adhesive on the surface of the roll.

The two illustrative examples of our invention may be modified in numerous ways. For example, a small electrically energized magnetic clutch may be substituted for the mechanical clutch which is illustrated in the first example. The essential features of our mechanism are that the roll shall turn freely in response to a pull exerted on it by the moving tape, but shall be rotated at a much lower rate of speed by independent power means when the tape has ceased moving through the taping head of the box taping machine or when no boxes are passing through the machine.

The speed of operation, of course, depends upon the type and size of box which is being manufactured. Considerable experience with various machines has shown that the apparatus is capable of operating at any speed within the range of present day commercial box taping machines.

Although the device has been shown and described in combination with automatic box taping machines, it is obvious that it may be used in manual tape dispensers and generally wherever it is necessary to apply emulsion adhesives to webs or tapes.

We claim:

1. An adhesive applicator adapted to apply an emulsion adhesive to an intermittently advancing box tape in a box taping machine wherein the tape is advanced by movement of the box comprising an adhesive applicator roll mounted to rotate freely in response to the advancement of the tape, means to maintain the tape in contact with the roll, adhesive supplying means located remote from the tape to supply adhesive to the roll, doctoring means between the adhesive supplying means and the tape on the periphery of the roll to control the thickness of the adhesive on the roll, power means to rotate the roll at a speed less than that speed at which the roll rotates when the tape is advancing along with the box and disconnect means interposed between the power means and the roll to disconnect the roll from the power means when the tape is advancing.

2. The adhesive applicator of claim 1, in which the disconnect means comprises an intermittent friction drive.

3. The adhesive applicator of claim 1 in which the doctoring means comprises a doctor roll having an adjustable clearance from the applicator roll and in which the power means include means to continuously rotate the doctor roll at a uniform speed independent of the rotation of the applicator roll.

References Cited in the file of this patent

UNITED STATES PATENTS

| Number | Name | Date |
|---|---|---|
| 2,290,200 | Murch et al. | July 21, 1942 |
| 2,395,903 | Nordquist | Mar. 5, 1946 |
| 2,459,091 | Page | Jan. 11, 1949 |